No. 844,384. PATENTED FEB. 19, 1907.
C. R. MESTON & H. I. FINCH.
ELECTRIC MOTOR.
APPLICATION FILED APR. 11, 1906.

3 SHEETS—SHEET 2.

Witnesses
Edgar T. Farmer
A. J. McCauley

Inventors:
Charles R. Meston
Herbert. I. Finch
by Bakewell Cornwell Atty's

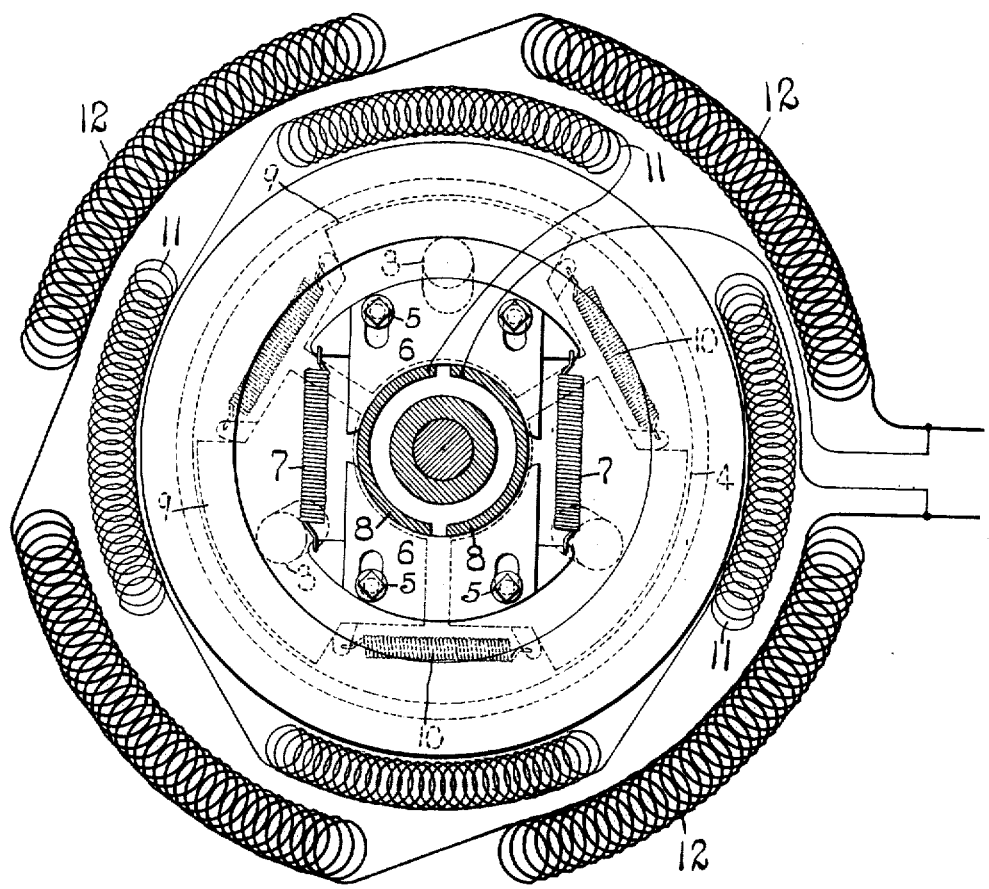

UNITED STATES PATENT OFFICE.

CHARLES R. MESTON AND HERBERT I. FINCH, OF ST. LOUIS, MISSOURI, ASSIGNORS TO THE EMERSON ELECTRIC MANUFACTURING COMPANY, OF ST. LOUIS, MISSOURI, A CORPORATION OF MISSOURI.

ELECTRIC MOTOR.

No. 844,384.     Specification of Letters Patent.     Patented Feb. 19, 1907.

Application filed April 11, 1906. Serial No. 311,188.

*To all whom it may concern:*

Be it known that we, CHARLES R. MESTON and HERBERT I. FINCH, citizens of the United States, residing at St. Louis, Missouri, have jointly invented a certain new and useful Improvement in Electric Motors, of which the following is a full, clear, and exact description, such as will enable others skilled in the art to which it appertains to make and use the same, reference being had to the accompanying drawings, forming part of this specification, in which—

Figure 1:
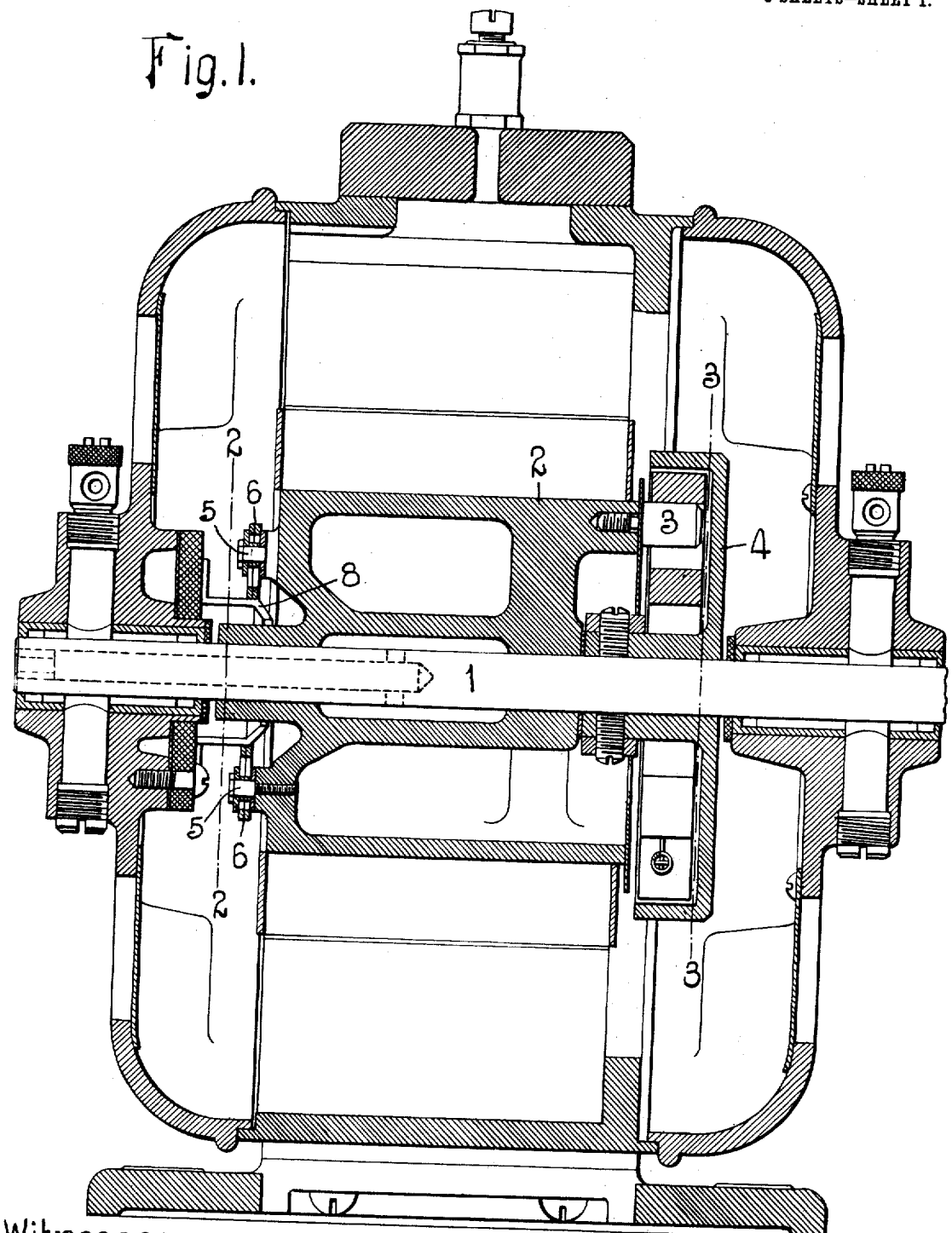
Figure 2:
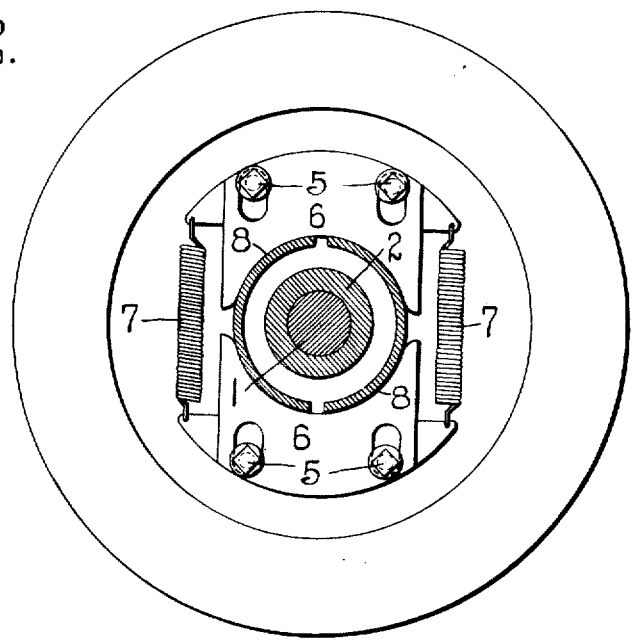
Figure 3:
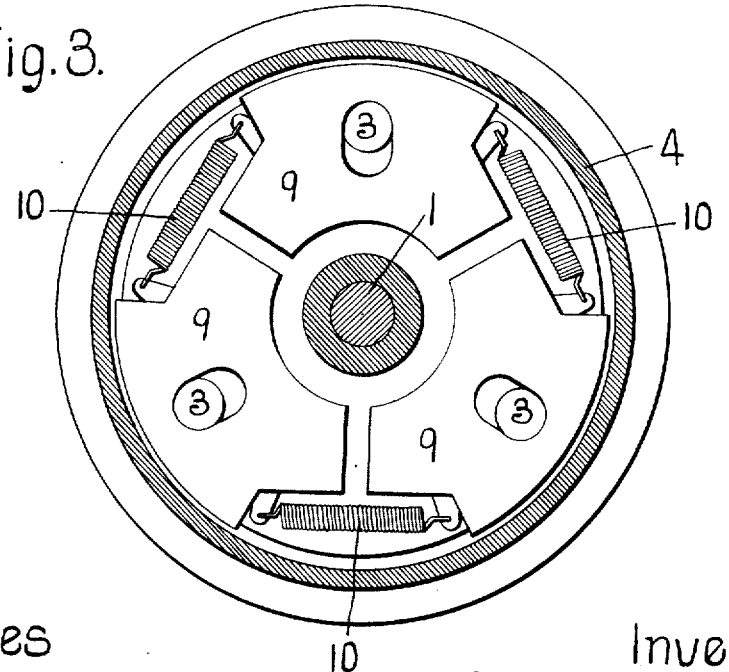

Figure 1 is a vertical longitudinal sectional view. Fig. 2 is a vertical cross-sectional view on the line 2 2 of Fig. 1. Fig. 3 is a vertical cross-sectional view on the line 3 3 of Fig. 1; and Fig. 4 is a diagrammatic view showing the field-winding, including the starting-coils and their connections to the controller-terminals.

This invention relates to a new and useful improvement in electric motors, particularly alternating-current motors, wherein there are employed starting-coils through which the current is directed when the motor is started, said coils when the motor attains speed being automatically cut out. When the motor attains speed, said armature automatically throws into operative position a clutch mechanism, whereby the armature becomes coupled to the shaft.

The object of our invention is to provide a motor having a simple form of mechanism for automatically coupling the armature to its shaft and cutting out the starting-coils.

By our improved construction the armature revolves freely on its shaft in attaining speed, and when the desired speed is attained the starting-coils are cut out and the clutch devices thrown into operative position, whereby the motor runs as an induction-motor and in addition to which the armature is coupled to the shaft by friction devices, whereby if the load is too heavy the coupling will permit independent rotation of the armature.

In Fig. 1 of the accompanying drawings is shown the framework of an alternating-current motor, having omitted the windings of the field and the details of the armature, the field-windings being shown diagrammatically in Fig. 4.

In the drawings, 1 indicates the armature-shaft mounted in suitable bearings in the frame of the motor, and 2 the armature-hub, which armature-hub carries pins or projections 3, there being preferably three of said projections mounted on the armature-hub, said armature-hub being mounted so as to freely rotate on the shaft 1.

4 is a clutch member in the form of a flanged disk which is fixed to the shaft 1.

The armature carries pins 5, which pass through elongated slots in contact-plates 6. (See Fig. 2.) There are two of these contact-plates oppositely disposed with respect to each other, their ends being connected by springs 7, which springs tend to hold said plates on the divided contact-ring 8. The two segments of ring 8 are connected in series with the starting-coils 11 of the motor, and the opening between said segments constitutes a break in the continuity of this circuit, which break is closed or completed by the contact-plates 6.

12 indicates the main field-coils, the terminals of which are connected to the starting-coils, as shown in Fig. 4.

Referring now to Fig. 3, it will be observed that the pins 3 pass through radial slots in weighted clutch members 9, connected together by springs 10.

In operation when the current is admitted to the motor, the plates 6 are in contact with the segments 8 of the divided contact-ring, completing the circuit through the starting-coils, causing them to be energized, and thus considerable torque is developed in the motor so as to cause the armature to rotate. It will be observed that the starting-coils are cut in by the plates 6 as long as the springs which connect the plates 6 together are of sufficient strength to overcome the centrifugal force acting upon said plates, due to the rotation of the armature. When the armature attains the desired speed, however, the strength of the springs is such with relation to centrifugal force acting upon the plates 6 that said springs will yield and permit said plates to fly outwardly and cut out the starting-coils. The clutch devices carried by the armature are also of such weight with respect to their restraining springs that they will, when the armature attains the desired speed, move outwardly into contact with the flange of the clutch-disk 4, causing the armature-shaft to be thus rotated.

We are aware that minor changes in the construction, arrangement, and combination of the several parts of our device can be made and substituted for those herein shown and described without in the least departing from the nature and principle of our invention.

Having thus described the invention, what is claimed as new, and desired to be secured by Letters Patent, is—

1. In an electric motor, the combination with an armature-shaft, an armature loosely mounted on said shaft, devices mounted on said armature constituting driving elements of a clutch, a companion clutch member fixed to the armature-shaft, and current-carrying devices carried by the armature, said current-carrying devices being in an operative position when the armature is attaining speed; substantially as described.

2. In an electric motor, the combination with an armature-shaft, of an armature loosely mounted thereon, centrifugally-operated clutch members operatively connected to said armature, a companion clutch member fixedly mounted on the armature-shaft, contact-making plates mounted on said armature, which contact-making plates occupy an operative position when the armature is attaining speed, said contact-making plates being rendered inoperative when the armature attains speed; substantially as described.

3. In an electric motor, the combination with an armature-shaft, an armature loosely mounted thereon, centrifugally-operated friction clutch devices rotatably carried by said armature, a companion clutch member fixedly mounted on the armature-shaft, and centrifugally-operated contact-making plates which, when the armature is attaining speed, complete the circuit through the starting-coils of the motor, and, when the armature has attained speed, said plates are moved to an inoperative position so as to cut out said starting-coils; substantially as described.

4. In an electric motor, the combination with an armature-shaft, of an armature loosely mounted thereon, a set of radially-moving plates mounted on said armature and constituting the driving element of a clutch, a companion clutch member fixedly mounted on the armature-shaft, contact-making plates mounted on said armature, which contact-making plates occupy an operative position when the armature is attaining speed and which are adapted to be rendered inoperative when the armature attains speed; substantially as described.

5. In an electric motor, the combination with an armature-shaft, of an armature loosely mounted thereon, pins on said armature, a set of plates provided with elongated slots through which said pins extend, said plates constituting a clutch member, yielding means for holding said plates in an inoperative position, a companion clutch member fixedly mounted on the armature-shaft, contact-making plates mounted on said armature, which contact-making plates occupy an operative position when the armature is attaining speed and which are adapted to be rendered inoperative when the armature attains speed; substantially as described.

6. In an electric motor, the combination with an armature-shaft, of an armature loosely mounted thereon, a set of radially-moving plates mounted on said armature and constituting the driving element of a clutch, a companion clutch member fixedly mounted on the armature-shaft, radially-moving contact-making plates mounted on said armature, which contact-making plates occupy an operative position when the armature is attaining speed and which are adapted to be rendered inoperative when the armature attains speed; substantially as described.

7. In an electric motor, the combination with an armature-shaft, of an armature loosely mounted thereon, a set of radially-moving plates mounted on said armature and constituting the driving element of a clutch, a companion clutch member fixedly mounted on the armature-shaft, radially-moving contact-making plates mounted on said armature, and yielding means for holding said contact-making plates in an operative position when the armature is attaining speed, said contact-making plates being rendered inoperative when the armature attains speed; substantially as described.

In testimony whereof we hereunto affix our signatures, in the presence of two witnesses, this 9th day of April, 1906.

CHARLES R. MESTON.
HERBERT I. FINCH.

Witnesses:
F. R. Cornwall,
George Bakewell.